United States Patent
Meredith, III et al.

(10) Patent No.: US 8,889,316 B2
(45) Date of Patent: Nov. 18, 2014

(54) ORGANIC/INORGANIC COMPOSITE BLEND MEMBRANE COMPOSITIONS OF POLYELECTROLYE BLENDS WITH NANOPARTICLES

(75) Inventors: James Carson Meredith, III, Marietta, GA (US); Pedro Jose Zapata, Hillsboro, OR (US); James T. Goldbach, Paoli, PA (US); David A. Mountz, Exton, PA (US)

(73) Assignee: Arkema Inc., King of Prussia, PA (US)

( * ) Notice: Subject to any disclaimer, the term of this patent is extended or adjusted under 35 U.S.C. 154(b) by 70 days.

(21) Appl. No.: 13/377,982

(22) PCT Filed: Jun. 14, 2010

(86) PCT No.: PCT/US2010/038451
§ 371 (c)(1),
(2), (4) Date: Feb. 2, 2012

(87) PCT Pub. No.: WO2010/147867
PCT Pub. Date: Dec. 23, 2010

(65) Prior Publication Data
US 2012/0135333 A1    May 31, 2012

Related U.S. Application Data

(60) Provisional application No. 61/187,068, filed on Jun. 15, 2009.

(51) Int. Cl.
| | |
|---|---|
| *H01M 8/10* | (2006.01) |
| *C08L 27/16* | (2006.01) |
| *C08J 5/22* | (2006.01) |
| *C08K 3/22* | (2006.01) |
| *C08L 33/14* | (2006.01) |

(52) U.S. Cl.
CPC ............ *C08L 27/16* (2013.01); *C08J 5/2275* (2013.01); *H01M 8/1044* (2013.01); *H01M 8/1051* (2013.01); *H01M 8/1067* (2013.01); *C08J 2327/16* (2013.01); *C08K 3/22* (2013.01); *C08L 33/14* (2013.01); *Y02E 60/521* (2013.01)
USPC .......................................... 429/492; 429/494

(58) Field of Classification Search
CPC . H01M 4/881; H01M 8/1025; H01M 8/1023; H01M 8/1004; H01M 4/926
USPC ................................................... 429/492, 494
See application file for complete search history.

(56) References Cited

U.S. PATENT DOCUMENTS

| | | | |
|---|---|---|---|
| 2004/0149572 A1 | 8/2004 | Schlenoff et al. | |
| 2004/0247975 A1 | 12/2004 | Song et al. | |
| 2006/0292415 A1 | 12/2006 | Song et al. | |
| 2007/0207359 A1 | 9/2007 | Chen et al. | |
| 2008/0166620 A1* | 7/2008 | Fuller et al. | 429/34 |
| 2008/0224101 A1* | 9/2008 | Niu et al. | 252/511 |
| 2009/0130161 A1 | 5/2009 | Sarangapani | |
| 2010/0119815 A1* | 5/2010 | Kim | 428/323 |

FOREIGN PATENT DOCUMENTS

JP        06203852 A  *  7/1994

* cited by examiner

*Primary Examiner* — Jane Rhee
(74) *Attorney, Agent, or Firm* — Thomas F. Roland (57) ABSTRACT

The invention relates to composite blend membranes formed from blends of one or more polyelectrolytes, and one or more types of nanoparticles. Preferably the blend also includes one or more fluoropolymers. The addition of the nanoparticles was found to enhance the conductivity and mechanical properties of the membranes.

11 Claims, 12 Drawing Sheets

Wide angle X-ray diffraction spectra of ZrO, ZrS, and ZrHP nanoparticle powders.

Figure 1

Wide angle X-ray diffraction spectra of ZrO, ZrS, and ZrHP nanoparticle powders.

Figure 2.

Wide angle X-ray diffraction spectra of composite membranes with different nanoparticle loadings. All the spectra correspond to KYNAR 731-based films (other PVDF grades exhibited identical behavior). The representative spectra of the nanoparticle modified PVDF film and the composite membranes correspond to ZrO.

Figures 3a, 3b

Representative SEM images of the cross-sectional area of various PVDF/PE/ZrX composite membranes, EHT 10 kV. (a) ZrHP 5wt%, (b) ZrHP 1wt%, (c) ZrS 5wt%, (d) ZrO 5wt%, and (e) ZrO 1wt%. The circled areas pointed by the arrows in (a) and (b) indicate large clusters of aggregated nanoparticles. The arrows in (c) indicate membrane defects created by agglomerates below the membrane surface similar to the one in the front plane of the image. The enclosed areas in (d) and (e) highlight the relatively smaller agglomerates of ZrO. The well dispersed small particles of about 300-400nm present in all the images correspond to polyelectrolyte clusters.

Proton conductivity of PVDF/PE/ZrX composite membranes (ZrHP ♦, ZrO ○, ZrS △) by PVDF grade. (a) KYNAR 500 (b) KYNAR 731, (c) KYNAR 2801 (d) KYNAR 2821, and (e) KYNAR 2851. The horizontal dotted lines (·······) represent reference non-hybrid PVDF/PE membranes for each corresponding PVDF grade. Testing conditions: 18.2 MΩ water at 25°C. Excitation signal: 1000Hz, 30mV. Values are presented as averages ± 95% confidence intervals.

Global unweighted means of conductivity, estimated from and 3-way univariate unbalanced GLM analysis (full factorial model), as a function of nanoparticle type (left) and nanoparticle content (right). Error bars represent the upper and lower bounds of 95% confidence intervals.

Elastic modulus (biaxial) of PVDF/PE/ZrX composite membranes (ZrHP ◆, ZrO –O–, ZrS –△–) by PVDF grade. (a) KYNAR 500 and (b) KYNAR 2851. The –O– horizontal dotted lines (······) represent reference non-hybrid PVDF/PE membranes for each corresponding PVDF grade. Values are presented as averages ± 95% confidence intervals.

Toughness (biaxial) of PVDF/PE/ZrX composite membranes (ZrHP ◆, ZrO ○, ZrS △) by PVDF grade. (a) KYNAR® 500 and (b) KYNAR 2851. The horizontal dotted lines (........) represent reference non-hybrid PVDF/PE membranes for each corresponding PVDF grade. Values are presented as averages ± 95% confidence intervals.

Figure 8

Global unweighted means of elastic modulus and toughness, estimated from 3-way univariate unbalanced GLM analysis (full factorial model), as a function of nanoparticle content. Error bars represent the upper and lower bounds of 95% confidence intervals.

ORGANIC/INORGANIC COMPOSITE BLEND MEMBRANE COMPOSITIONS OF POLYELECTROLYE BLENDS WITH NANOPARTICLES

FIELD OF THE INVENTION

The invention relates to composite blend membranes formed from blends of one or more polyelectrolytes, and one or more types of nanoparticles. Preferably the blend also includes one or more fluoropolymers. The addition of the nanoparticles was found to enhance the conductivity and mechanical properties of the membranes.

BACKGROUND OF THE INVENTION

One of the key components of the polymer electrolyte membrane fuel cell (PEMFC) is the polymer electrolyte membrane (PEM). The PEM is a proton-conducting polymeric solid that provides a proton transport vehicle between the anode and the cathode, while simultaneously serving as a barrier to prevent intermixing of the fuel and oxidant streams. Besides these proton transport and gas barrier properties, the PEM needs to satisfy other essential requirements for the appropriate operation of the fuel cell, including: low electrical conductivity, water transport, high hydrolytic stability, and excellent mechanical integrity, among others.

Over the past years, research endeavors have focused on developing new cost-effective and operationally sound PEM materials with the purpose of closing the gap between the actual PEMFC technology (based primarily on perfluorosulfonic acid (PFSA) membranes) and commercialization targets (e.g., DOE targets for portable fuel cells). Numerous approaches are being considered in the development of these new PEM materials, including: modification of PFSA-based membranes, functionalization of high-performance hydrocarbon polymers, polymer blends of inert and ionic conductive precursors, and organic/inorganic composite membranes, and organic/inorganic composite or hybrid proton exchange membranes.

PEMs from semi-interpenetrated networks of poly(vinylidene fluoride) (PVDF) and covalently-cross-linked sulfonated acrylic polyelectrolytes have been shown to exhibit acceptable proton conducting and mechanical properties comparable or better than NAFION standards.

There is a need to further improve the conductivity and mechanical properties of the PVDF/PE membranes.

Surprisingly, the addition of nanofillers, and especially zirconium-based nanofillers into polyvinylidene fluoride (PVDF)/polyelectrolyte blends produces organic/organic/inorganic tri-phase PEMs having improved conductivity and mechanical properties.

DETAILED DESCRIPTION OF THE INVENTION

The composite blend membranes of the present invention are blends of polyelectrolytes, nanoparticles, and option (but preferred) fluoropolymers.

Polyelectrolyte

Polyelectrolytes are polymeric resins containing ionic and/or ionizable groups, such as a sulfonated and/or phosphonated group, as known in the art. Polyelectrolytes generally contain an aliphatic or aromatic (hydrocarbon, fluorinated or perfluorinated)-containing backbone, with ionic and/or ionizable pendant groups. The equivalent weight as expressed as grams of material per mol of ionic/ionizable group is a typical methodology used to express the content of ionic/ionizable group in any given material. In this invention, the polyelectrolytes used have equivalent weights ranging from 130 to 2000 g/mol. One or more ionic/ionizable-group containing monomers can be polymerized with other monomers to form a copolymer. The remainder of the copolymer is composed of one or more monomers polymerizable with the ionic/ionizable group-containing monomer(s).

The terms polymer and (co)polymer, as used herein refer to polymers formed from one or more monomers. This includes homopolymers, copolymers, terpolymers and polymers formed from four or more monomers. Copolymer refers to both random and block copolymers, as well as graft copolymers. Copolymer is also used to describe a polymer resembling a copolymer which is formed by the partial reaction/substitution of some of the side groups of a homopolymer, resulting in a polymer backbone having two or more different moieties as side chains. Copolymers generally contain from 20 to 99 mole percent of the polyelectrolyte, more preferably 30 to 90 mole percent.

Nanoparticles

Candidate inorganic materials for use in composite membranes include, but are not limited to: silica/silicates, titania, zirconia, alumina, zeolites, sulfonated silica, inorganic heteropolyacids (e.g. phosphotungstic acid particles on metal oxide supports), zirconium hydrogen phosphate, carbon nanotubes, graphenes, fullerenes, nanodiamonds, sulfonated nanotubes, nanoclays such as montmorillonites, sulfonated nanoclays such as montmorillonites containing sulfonated grafts, silsesquioxanes, silsesquioxanes functionalized with groups containing sulfonic acid, and metal-organic framework (MOF) materials. Also of interest are transition metal sulfide, selenides, and tellurides such as cadmium selenide (CdSe), cadmium telluride (CdTe), and lead sulfide (PdS) as well as 'traditional' nanoparticles of elemental metals that may exhibit additional catalytic properties such as palladium, gold and platinum. It could also be envisioned that the nanoparticles be partly or entirely organic in nature such as the case of polymer lattices, cross-linked polymeric ion-exchange resins, clusters of liquid crystalline-type molecules, and organic-functionalized polyhedralsilsesquioxanes. In these cases, the organic-type nanoparticles could also bear ionic or ionizable, or additional functionality that may assist in their dispersion or immobilization in a matrix material as is widely known in the art.

Candidate inorganic nanoparticles, the chemical nature of which is described above, can also be defined by their physical size in as measured in one of more dimensions depending on the general geometric shape of the particle in question. Typical three-dimensional spherical-like particles such as silicas, silsesquioxanes, platinum, for example can be defined by measurement of a particle diameter from one edge, perpendicularly through the center of the particle, to the opposite edge of the particle. In the case of a faceted, dendritic or otherwise geometrically-shaped particle, the diameter can be defined as the measurement from one facet face or apex, perpendicularly through the center of the particle to the opposite face or apex. In the case where multiple nanoparticles may be agglomerated into larger structures, descriptions in this invention relate to the smallest three-dimensional sub-unit of such agglomerates. For application in this invention, three-dimensional nanoparticles will have a diameter as defined previously ranging from 0.5 nm to 1000 nm, preferably from 1.0 to 200 nm, and most preferably from 1.0 to 100 nm.

Considering the case of sheet-like two-dimensional nanoparticles, where an individual particle can be defined as having a thickness of likely less than him, its length and width dimensions could be relatively large, ranging from 1.0 nm to 100 μm, preferably from 5.0 nm to 10 μm, and most preferably from 10.0 nm to 5 μm. These types of materials include graphene, graphite and montmorillonite, and typically exist as stacks of multiple 'sheets' which can be separated into individual 'sheets' or particles by various physical processing or chemical methodologies as known in the art.

In addition, considering the case of tubular or cylindrically-shaped 'nanoparticles', such as carbon, metal or metal alloy nanotubes, the particles can be defined by measurement of a tube diameter extending from one edge of the tube, perpendicularly through the center, to the opposite edge of the tube. This measurement of the diameter of the tube can range from 0.5 nm to 100 nm, preferably from 1.0 nm to 50 nm and most preferably from 1.0 nm to 30 nm. In this case, the tube length can encompass a large size range such as from 1.0 nm to 100 μm, preferably from 10 nm to 10 μm, and most preferably from 50 nm to 5 μm. Also, in this case, the nanoparticles can exist as multiple cylinders within larger cylinders such as the case of the well-known 'multi-walled carbon nanotubes'. In this case, and for application in this invention, such structures are measured and defined by the diameter of the walls of the outermost tube in any given multi-walled nanotubes structure.

Among these, nanoparticles containing ionic or ionizable groups (i.e. acidic groups) appear to have the most potential for application to proton-conductive membranes owing to their proton-conducting properties, as well as their hydrophilicity and self-humidification characteristics. The reason behind this resides in the synergistic beneficial effects in proton conductivity, mechanical properties, thermal stability, membrane humidification, and fuel crossover reduction that may arise by introducing inorganic nanofillers in the polymer matrix of the membranes.

Of particular interest are tetravalent metal acids based on zirconium, (i.e., zirconium oxide, zirconium hydrogenphosphate, and zirconium hydroxide sulfated), and in particular zirconium phosphate, which can preserve its proton conductivity up to 300° C.; and sulfated zirconia, which is one of the strongest solid superacids known and can retain sulfonic acid groups responsible for proton conduction up to 500° C.

The nanoparticles are present in the composition at from 0.1 to 20 percent by weight based on the polyelectrolyte or the polyelectrolyte/fluoropolymer blend, and preferably from 0.1 to 5 percent by weight.

Fluoropolymer

Polyelectrolytes may be, and preferably are, blended with one or more fluoropolymers, such as poly(vinylidene fluoride) (PVDF) homopolymer and copolymers, in order to improve physical, chemical, and electrochemical properties to form membranes. Polyelectrolytes bearing a wide range of functionalities can be successfully incorporated into PVDF (such as KYNAR resin) blends by carefully controlling the processing parameters utilized; providing that the polyelectrolytes bear a significant fraction of ionic/ionizable units such as sulfonates, phosphonates, or carboxylates. See U.S. Pat. No. 6,872,781; U.S. Pat. No. 6,780,935; U.S. Pat. No. 7,449,111, and U.S. Pat. No. 7,396,880 all incorporated herein by reference.

The polymer blend of the present invention is an intimate blend of the polyelectrolyte with a fluoropolymer. Preferably, the attachment between the polyelectrolyte and the fluoropolymer is a physical attachment, though attachments other than physical attachments are within the bounds of the present invention including chemical attachments. The amount of fluoropolymer can be from about 5 to about 95 weight percent and the amount of the polyelectrolyte can be from about 95 to about 5 weight percent. Preferably, the fluoropolymer is present in an amount from about 20 to about 70 weight percent and the amount of polyelectrolyte from about 30 to about 80 weight percent.

With respect to the fluoropolymer, the fluoropolymer can be a homopolymer or other type of polymer, and can be a mixture of fluoropolymers or a mixture of fluoropolymer with a non-fluoropolymer. Preferably, a thermoplastic fluoropolymer is used. Preferably, this fluoropolymer or mixture of fluoropolymers can be any fluoropolymer(s) that can form a polymer blend with the other components, including other polymers present. Preferably, the fluoropolymer is a poly(vinylidene fluoride) polymer such as a poly(vinylidene fluoride) homopolymer. Other examples of fluoropolymers include, but are not limited to, a poly(alkylene) containing at least one fluorine atom, such as polytetrafluoroethylene, poly(vinyl fluoride), poly(vinylidene fluoride-co-hexafluoropropylene), poly(vinylidene fluoride-co-fluorinated vinyl ether), poly(tetrafluoroethylene-co-fluorinated vinyl ether), poly(fluorinated alkylene-co-vinyl ether) or combinations thereof. More preferably, the fluoropolymer is a polymeric composition containing from about 30% to about 100 weight %, preferably 70-95 weight % of vinylidene fluoride and from 0% to about 70 weight %, preferably 5 to 30 weight % of at least one poly(alkylene) containing at least one fluorine atom, such as, hexafluoropropylene, tetrafluoroethylene, trifluoroethylene (VF3), chlorotrifluoroethylene, and/or vinyl fluoride. Preferably, the weight average molecular weight (MW) of the fluoropolymer, which can include homopolymers, copolymers, terpolymers, oligomers, and other types of polymers, is from about 80,000 MW to about 1,000,000 MW and, more preferably from about 100,000 MW to about 500,000 MW. The fluoropolymers can be prepared using the techniques described in U.S. Pat. Nos. 3,051,677; 3,178,399; 3,475,396; 3,857,827; and 5,093,427, all incorporated herein in their entirety by reference.

The blending process of the matrix fluoropolymer and polyelectrolyte preferably involves the conversion of the protogenic/acidic groups into a neutralized form, and preferably a tetraalkylammonium (TAA)-neutralized form. This can be achieved through various processes known in the art. Preferably the ammonium salt has a molecular weight of at least 186 g/mol. Examples of suitable ammonium salts include: tetramethylammonium, tetraethylammonium, tetrapropylammonium, tetrabutylammonium, tetrapentylammonium, tetrahexylammonium, and asymmetric-type moieties such as octyltrimethylammonium or benzyltrimethylammonium.

A solution of this TAA-neutralized polyelectrolyte is then prepared in an appropriate solvent which may appropriately dissolve the matrix (co)polymer of choice. As stated above, the amount of matrix polymer can be from 5 to 95 weight percent and the amount of polyelectrolyte can be from 95 to 5 weight percent in the blend solution. Preferably, the matrix polymer is present in an amount of from 20% to 70 weight percent and the polyelectrolyte is present at from 30 to 80 weight percent in the blend solution. This blended solution is then cast into a thin film or further processed to yield a useful article such as an ion-exchange membrane.

Membrane Formation

Casting of the blended solution can be carried out by many different procedures familiar to those skilled in the art, such as extrusion, molding, solvent casting, and latex casting. The formed film or membrane may be used as a single layer, or may be part of a multi-layer film or membrane. A preferred method is solution casting with heating. The thickness of the formed, wet film before drying is dependent on the end-use of the material, and can vary from 1.0 µm to 2.0 mm. Preferably, the formed film has a thickness of 5.0 µm to 500.0 µm and most preferably from 20.0 µm to 500.0 µm. This 'wet' film is then dried in a air-circulating oven at elevated temperature. The time and temperature for drying the film can vary widely. The temperature used is from 20° C. to 250° C., preferrably from 100° C. to 220° C., and most preferrably from 120° C. to 200° C. The drying time for the wet film can also vary widely. The oven residence time should be commercially applicable and scalable in that it can be from 1.0 s to 24 h, preferrably from 1.0 min. to 2.0 h, and most preferrably from 1.0 min. to 45.0 min.

The thickness of the final, dried film depends on the original thickness of the wet film before drying. This thickness will vary depending on the application intended for the final article. The thickness can be from 1.0 nm to 2.0 mm, preferrably from 5.0 µm to 500.0 µm, most preferrably from 10.0 µm to 300.0 µm. The dried film is removed from the substrate by typical methods familiar to those skilled in the art.

The domain size of the polyelectrolyte in a cast, dried polymer blend film should be preferrably less than 1.0 µm, and more preferrably between 1 nm to 500 nm. The domain sizes discussed herein are with respect to maximum domain sizes and/or average domain sizes. In a preferred embodiment, the domain sizes recited are the maximum domain sizes, but can be the average domain sizes.

The proton conductivity of the polymer blend of the invention is >10 mS/cm, preferrably >50 mS/cm, and most preferrably >100 mS/cm. Additionally, the polymer blend has a high degree of mechanical strength, a low swelling when hydrated, hydrolytic (chemical) stability, and a low level of sulfur loss (if sulfonated) in hot water, hot acid, oxidizing and/or reducing environments.

An article, such as a membrane, produced from the polymer blend of the invention can be used as-is or further treated by an acidic washing step to remove the tetraalkyl groups, concurrently reprotonating the ionizable groups present on the starting (co)potymer component.

Due to the various advantages described above, the applications of the present invention can include, but are not limited to, films, membranes, fuel cells, coatings, ion exchange resins, oil recovery, biological membranes, batteries, water purification membranes and the like. The resultant articles can be utilized as perm-selective membranes for fuel cell, battery, or other electrochemical device applications. In addition, the resultant articles may be applied to electrodes, or have electrode material applied to it, for the construction of a membrane-electrode-assembly, may be imbibed with various liquids, or may be introduced onto or into a reinforcing matte or porous web to increase mechanical integrity.

Dispersion of nanoparticles in the polymer matrix can be thermodynamically limited as unfavorable particle-polymer interactions result in severe aggregation of the solid-phase particularly at high particle loadings (ie. 5.0 wt %). Nevertheless, a general improvement in proton conductivity was evidenced in composite membranes with low to medium nanoparticle loadings (ie. 0.5 to 1 wt %), in comparison to non-hybrid PVDF/polyelectrolyte blend membrane references. This beneficial effect was particularly noticeable in membranes manufactured from highly crystalline PVDF homopolymers (7% to 14.3% increment). Similarly, tensile properties were enhanced at identical particle loadings (19.5% to 22.5% elastic modulus increment); especially in membranes containing more flexible PVDF/HFP copolymers, where a reinforcing stiffening effect was evident.

Proton-conducting tri-phase composite membranes were fabricated by incorporating zirconium oxide, zirconium hydroxide sulfated, and zirconium hydrogenphosphate nanoparticles to polymeric blends of numerous PVDF grades and a cross-linked sulfonated acrylic polyelectrolyte. The proton conductivity and mechanical properties of the membranes were assayed by means of custom designed electrochemical impedance spectroscopy and biaxial axisymmetric deformation high-throughput screening tools. Compared to non-hybrid PVDF/PE reference membranes, the resulting composite membranes exhibited overall improved conductivity at low to medium particle loadings. A particular beneficial effect in conductivity from the added nanofillers was observed in composite membranes prepared from highly crystalline PVDF homopolymers (i.e., KYNAR 500 and 731), where the hydration layer of the embedded nanoparticles constituted a proton-conducting route. Tensile properties were similarly enhanced by the insertion of inorganic nanofillers, especially in membranes containing more flexible PVDF:HFP copolymers (i.e., KYNAR 2801, 2821, and 2851) where a reinforcing stiffening effect was evident at low to medium nanoparticle loadings. This increment in the elastic modulus was, however, detrimental for membrane toughness throughout the whole range of PVDF grades and particle loadings. Nanoparticle dispersion was thermodynamically limited as unfavorable particle-polymer interactions resulted in severe aggregation of the solid-phase at high particle contents. Since the degree of nanoparticle dispersion is critical for modulus and strength development, all mechanical properties were significantly lessened at high nanoparticle loadings. Proton conductivity was similarly affected since aggregated nanoparticles resulted in increased diffusional resistance by occupying the volume otherwise corresponding to proton-conducting channels.

EXAMPLES

Composite Membrane Synthesis and Protonation

Organic/organic/inorganic tri-phase nanocomposite proton-conducting composite membranes were prepared by mixing zirconium-based nanoparticles and individual blends of five KYNAR PVDF grades and a sulfonated acrylic polyelectrolyte (PE) consisting of a random copolymer of 2-sulfoethyl methacrylate (SEM) (~69 wt %), 2-hydroxyethyl methacrylate (HEMA) (~15 wt %), methyl methacrylate (MMA) (~8 wt %), and styrene (~7 wt %); and an equivalent weight of 280 g PE/mol $SO_3H$. The five different grades of PVDF, including two PVDF homopolymers (KYNAR 500 and KYNAR 731), and three copolymers of PVDF and hexafluoropropylene (PVDF:HFP) (KYNAR 2801, KYNAR 2821, and KYNAR 2851) (Arkema Inc.); were dissolved in 1-methyl-2-pyrrolidinone (NMP) (Sigma-Aldrich Co., assay ≥99.5%) to a total concentration of 10 wt % per solution. These PVDF solutions were mixed with a stock solution of the PE (25 wt % total solids in NMP) at a fixed mass ratio (dry base) of 65:35 (PVDF:PE, acid form). Three different types of zirconium-based particles were utilized; namely, zirconium(IV) oxide nanopowder ($ZrO_2$) (particle size <100 nm), zirconium(IV) hydroxide sulfated ($Zr(H_2SO_4)_4$), and zirconium(IV) hydrogenphosphate ($Zr(HPO_4)_2$) (Sigma-Aldrich Co.). The size of the mesoporous zirconium(IV) hydroxide sulfated and zirconium(IV) hydrogenphosphate particles was further reduced by crushing them using a zirconia mortar and pestle; the zirconium oxide nanopowder was utilized as received. Final particle size was approximately 100-300 inn for zirconium (IV) hydroxide sulfated and 200-1000 nm for zirconium(IV) hydrogenphosphate. For the sake of simplicity for the remainder of this work zirconium oxide and the modified sulfated zirconium hydroxide and zirconium hydrogenphosphate will be referred to as ZrO, ZrS, and ZrHP respectively. Prior to mixing with the PVDF/PE blends the nanoparticles were de-agglomerated and suspended in NMP by vigorous stirring for 6 h, followed by overnight sonication in an ultrasonic bath, and 20 min "strong" sonication using a horn-type sonicator. Each nanoparticle suspension type was mixed with every PVDF/PE blend at 0.5 (low), 1 (medium), and 5 wt % (high) (dry base) to give a total of 45 different mixtures (in addition to five reference PVDF/PE blends without nanoparticles). The PVDF/PE/ZrX (X=O, P, HP) mixtures were combined with Desmodur N-3300A (Bayer AG.), a 1,6-hexamethylene diisocyanate-derived triisocyanate crosslinker, at a 1:0.8 OH:NCO ratio (80 mol % of the stoichiometric amount of cross-linker needed to react with all the polyelectrolyte hydroxyl groups). The final blends were thoroughly mixed at room temperature under an inert nitrogen atmosphere for approximately 30 minutes, followed by a degassing and re-dispersion of the nanoparticles by sonication (~15 min) immediately before film coating. Coating was performed using a knife-edge apparatus to spread liquid PVDF/PE/ZrX films onto silicon <100> substrates (Silicon, Inc.) previously cleaned for 2 hours in Piranha solution (70% $H_2SO_4$, 9% $H_2O_2$, 21% $H_2O$) at 80° C. The resulting films were cured at 175° C. for 20 minutes in a forced convection oven to cross-link the PE and remove excess NMP. Cured composite membranes were detached from the silicon substrates by immersion in deionized (DI) water at room temperature.

Composite membranes were washed in a 1M hydrochloric acid solution at 80° C. for 2 hours, followed by a 15-minute rinse in DI water. The acid-washed membranes were protonated by immersion in 1M $H_2SO_4$ at 80° C. for 2 hours, followed by removal of excess sulfuric acid by several successive 15-minute rinses in DI water until the pH of the rinse water was above 4. Conditioning of protonated composite membranes, as well as nanoparticle-free PVDF/PE references, was carried out by immersion in boiling 18.2 MΩ water for one hour to allow complete membrane swelling. Swollen membranes were stored in 18.2 MΩ water until conductivity and mechanical property measurements were performed.

Composite Membrane Characterization
High Throughput Measurement of Proton Conductivity and Mechanical Properties Proton conductivity measurements were performed by AC electrochemical impedance spectroscopy (EIS) using a custom automated 4-point probe high-throughput conductivity measuring device (HTC) designed in our lab. Conductivity measurements of composite membranes and reference membranes submerged in 18.2 MΩ water at approximately 25° C. were performed in potentiostatic mode with an excitation signal of 1000 Hz and 30 mV (~20 mV RMS), and a response signal integration time of 5000 cycles following a 5 second stabilization period.

Characterization of mechanical properties was carried out using a modified high-throughput mechanical testing apparatus (HTMECH) based on a previous design developed in our lab. All mechanical characterization tests were performed at a constant speed of 10 mm/s using a 1.24 mm diameter needle (needle to isolation plate hole diameter ratio: 0.413). Sampling rate of the load cell signal was set to 5000 samples per second. All membranes were tested in a fully hydrated state. As otherwise stated, conditioning and analysis of raw data from HTMECH tests was carried out via either undecimated wavelet transform with multiple-level resealing to estimate noise variance (noise was not assumed white), universal threshold, and an orthogonal $8^{th}$ order Symlet (Sym8) wavelet type; or a non-causal zero-phase HR filter using $1^{st}$ order Chebyshev coefficients, a passband ripple of 0.3 dB, and a cutoff frequency of 10 Hz. Bisquare fitting sensitivity was set to 95% for linear fitting of elastic modulus.

X-Ray Diffraction (XRD)

X-ray diffraction spectra of composite membranes and nanoparticle powders were recorded using a PANalytical X'Pert PRO diffractometer (PANalytical). The incident beam configuration consisted of a Cu-anode tube ($\lambda$ $CuK\alpha_1$=1.540598 Å, $\lambda$ $CuK\alpha_2$=1.544426 Å) operated at 45 kV and 40 mA with a fixed $\frac{1}{16}°$ (0.19 mm) divergence slit, a 0.04 rad Soller slit, and a nickel β-filter to remove CuKβ radiation. The detector, a PANalytical X'Celerometer, was equipped with a 10 mm anti-scatter slit and a 0.04 rad Soller slit. Data was collected over a 2θ range of 1°-65° using a step size of 0.033°.

Fourier Transform Infrared Spectroscopy (FT-IR)

Infrared absorption spectra of composite membranes were collected at room temperature with a Bruker Equinox 55 spectrometer (Bruker Optics Inc.) coupled with a KBr beam splitter. The spectra were recorded in the range of 400-5000 $cm^{-1}$ at a resolution of 4 $cm^{-1}$ and averaged 128 times.

Scanning Electron Microscopy (SEM)

High resolution images of the cross-sectional area of composite membranes were obtained using a LEO 1530 thermally-assisted field emission scanning electron microscope (LEO Electron Microscopy Group), operated at 10 keV. Membrane samples for SEM imaging where prepared by cryogenic breaking in liquid nitrogen followed by vacuum metallization with gold.

Statistical Analysis

An unbalanced univariate general linear model (GLM) (2 and 3-way, type III sums of squares) was used for evaluation of significant factors; $p<0.05$ was defined as significant (5% significance level). Pairwise comparisons of significant factors from 3-way GLM tests were performed by comparisons of unweighted means of main effects with Sidak-adjusted confidence intervals; while Tamhane's T2 post hoc test was utilized for pairwise comparisons of significant factors from 2-way GLM tests. All results are expressed as mean±standard error of the mean (±S.E.M.) or as mean±95% confidence intervals, according to indicated.

Results and Discussion

Microstructure of Composite Membranes

Figure 1:
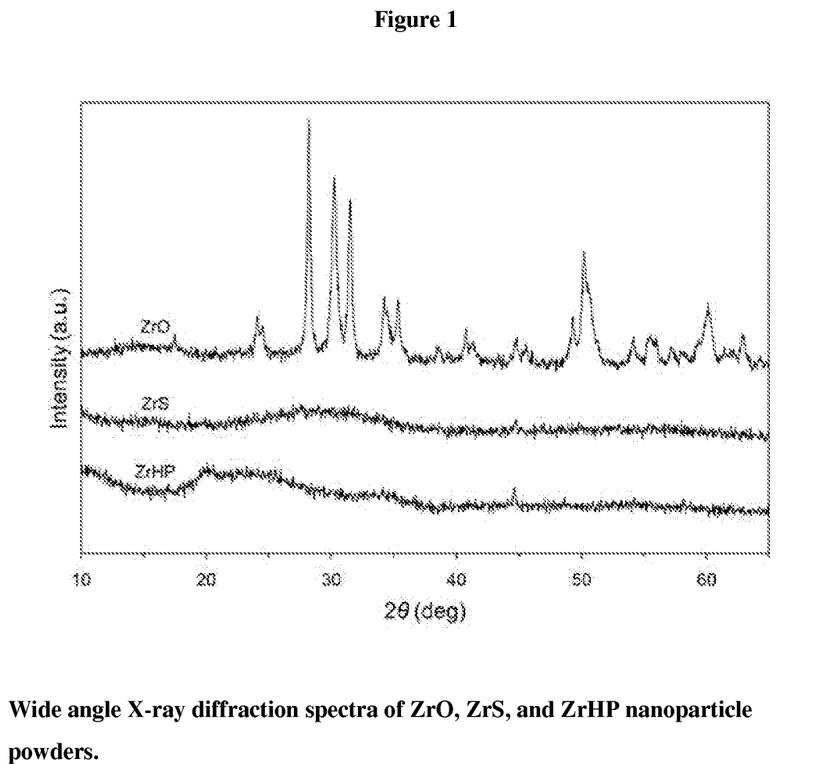
FIG. 1. Wide angle X-ray diffraction spectra of ZrO, ZrS, and ZrHP nanoparticle powders.

The structure of the zirconium-based additives (ZrX) is of relevance in the characterization of the composite membranes because of their organic/inorganic hybrid nature. Consequently, a preliminary study of the different solid zirconium-based particles, via powder X-ray diffraction (XRD), was completed prior to membrane characterization. The XRD spectra obtained are reproduced in FIG. 1. The crystalline reflections (Bragg peaks) in the zirconia (ZrO) spectrum, particularly those located at scattering angles (2θ) of 28.2°, 30.2°, and 31.5°, indicate a mixed crystalline form of monoclinic and tetragonal ZrO phases. In contrast, ZrHP and ZrS are characterized by an amorphous halo with absence of crystalline reflections. In the case of ZrHP the amorphous spectrum indicates a disordered layer aggregation, and thus, the absence of lamellar α-ZrHP and/or γ-ZrHP. From a practical point of view, this may be beneficial for the overall proton conductivity of ZrHP-based composite membranes as amorphous ZrHP exhibits higher conductivity than comparable crystalline and semi-crystalline α-ZrHP and γ-ZrHP ($1-5\times10^{-3}$ vs. $1.8\times10^{-5}$ and $2\times10^{-4}$ S/cm at 100° C. and 95% relative humidity (RH), respectively). Similarly, conductivity of membranes based on amorphous ZrS could potentially benefit from a larger number of surface acid sites exposed, given that amorphous materials generally exhibit larger surface area than crystalline counterparts.

Figure 2:
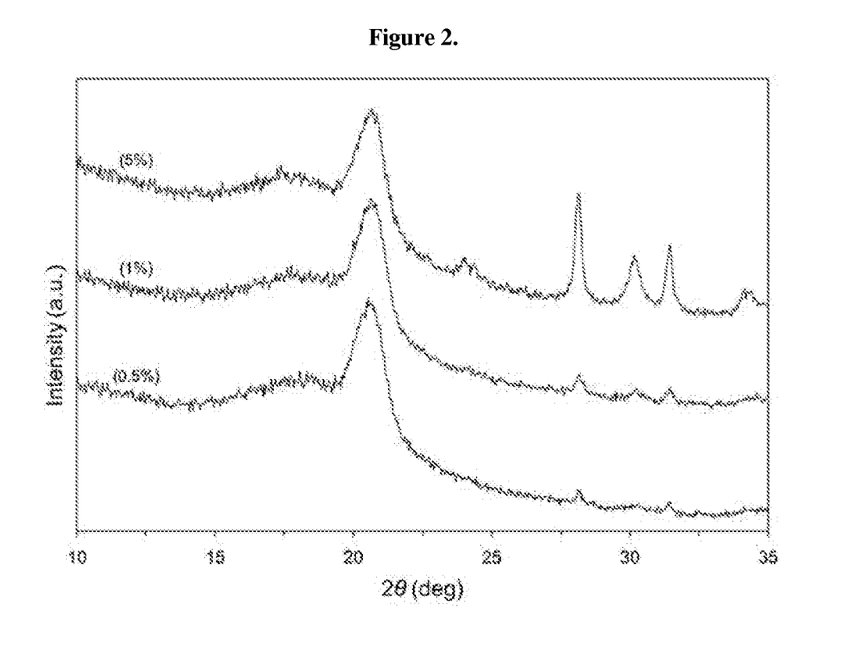
FIG. 2. Wide angle X-ray diffraction spectra of composite membranes with different nanoparticle loadings.
Figure 3A:
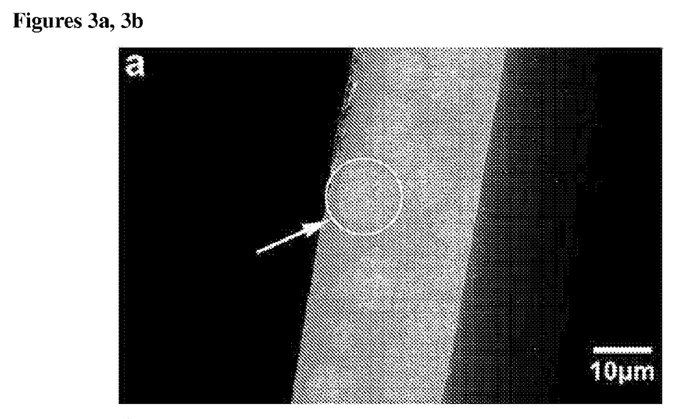
FIG. 3. Representative scanning electron microscopy images of the cross-sectional area of various PVDF/PE/ZrX composite membranes, FIG. 4. Proton conductivity of PVDF/PE/ZrX composite membranes FIG. 5. Global unweighted means of conductivity, as a function of nanoparticle type (left) and nanoparticle content (right). Error bars represent the upper and lower bounds of 95% confidence intervals.
Figure 3B:
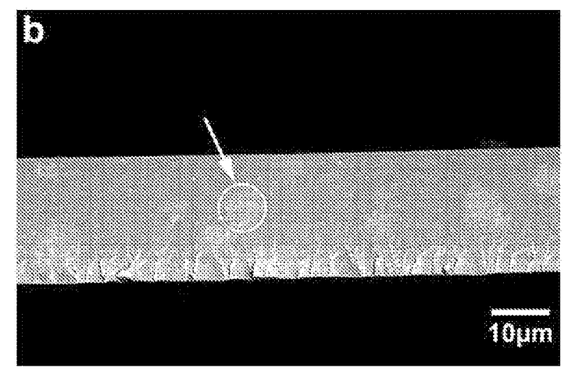
Figure 3C:
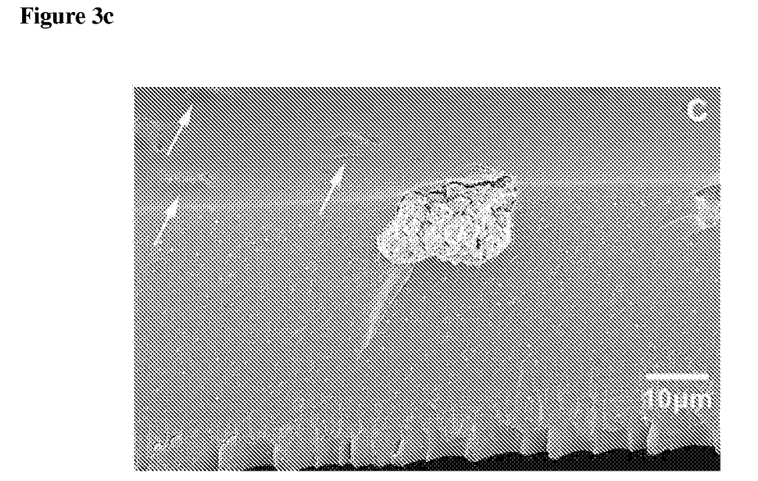
Figure 3D:
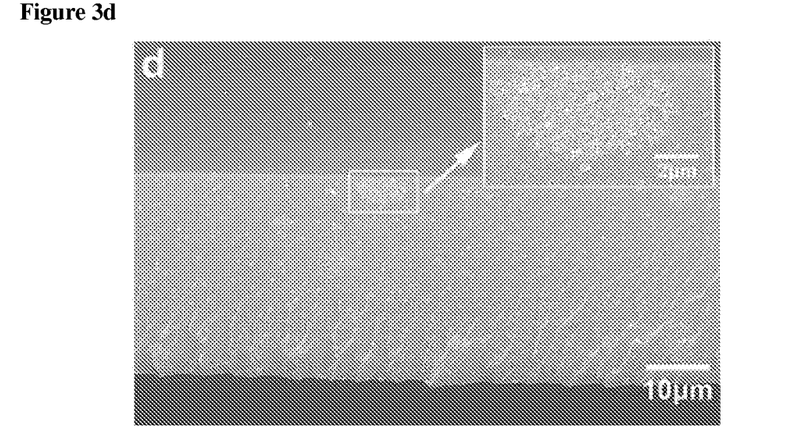
Figure 3E:
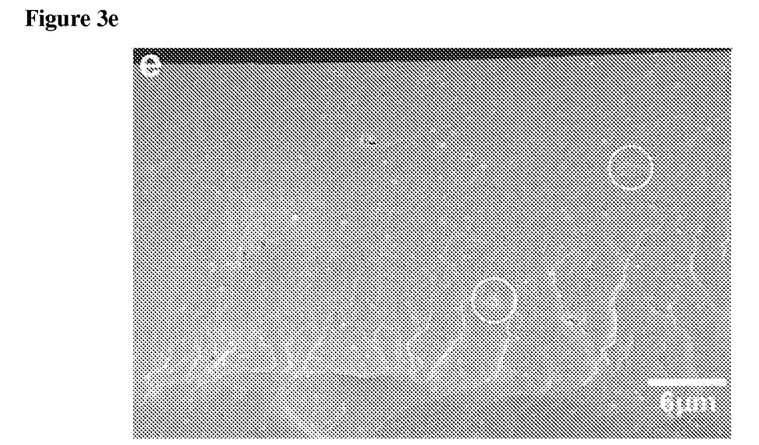

It has been shown that the incorporation of either polyelectrolyte (PE) or ZrX into the PVDF matrix disturbs the PVDF crystalline structure by inducing α- to β-phase transitions; as a result, the β-phase polymorph is prevalent in the PVDF support matrix of the composite membranes, as determined by wide-angle x-ray diffraction (XRD) data as shown in FIG. 2. The diffraction peaks at 28.2°, 30.2°, and 31.5° in the representative XRD spectra of composite membranes correspond to ZrO particles embedded in the polymer matrix. The intensity variation of these crystalline reflections is a clear indicator of different particle loadings. A foremost concern when preparing polymeric composites by addition of an inorganic component to a polymer solution or dispersion, is the formation of a highly disperse solid phase within the polymer matrix. Consequently, SEM imaging was employed to assess the dispersion of the zirconium-based additives in the PVDF/PE polymer matrix of the composite membranes (FIGS. 3a-e). It is readily seen that the particles aggregate and form clusters that are distributed non-homogeneously throughout the membrane, particularly at high loadings. Therefore, regardless of possible attractive interactions based on hydrogen bonding and/or dipole-dipole interactions between the ZrX and the PVDF polar groups that can stabilize the solid phase dispersion at low particle loadings, the aggregation behavior witnessed in the PVDF/PE/ZrX composite membranes at medium and high particle mass fractions may be explained by a general unfavorable interaction between the hydrophilic surface of the ZrX particles and the hydrophobic polymer matrix. Due to the large surface-to-volume ratio of the nanoparticles this incompatibility is greatly amplified, especially when no surface modifiers or compatibilizers are utilized. Similarly, In the case of ZrO particles, a reduced surface-to-volume ratio owing to their crystalline form might explain the better dispersion of this additive at all mass fractions when compared to ZrS and ZrHP (FIGS. 3d and 3e).

It is anticipated that other means may be used to improve the nanoparticle dispersion in the PVDF/PE matrices, such as compatibilization and pre-exfoliation of zirconium-based nanoparticles via organomodification with tetra-n-butylammonium hydroxide, and formation of pre-dispersed particle gels in NMP compatible with the PVDF/PE blends.

Proton Conductivity

The proton conductivity from high-throughput conductivity (HTC) screening of 45 dissimilar zirconium-based composite membranes, as well as five PVDF/PE reference membranes, is shown in FIGS. 4a-e. An initial assessment of the plots reveals higher overall conductivity values for membranes containing PVDF:HFP copolymers versus PVDF homopolymer, in agreement with our previous study of non-hybrid PVDF/PE proton exchange membranes It also appears to be a general reduction in proton conductivity in composite membranes with high content of nanoparticles with respect to corresponding nanoparticle-free references, which might be directly related to the particle aggregation and clustering noticed at high particle mass fractions (FIGS. 3d and 3e). In addition, a seemingly beneficial effect from the incorporation of zirconium-based additives to the PVDF/PE blends is evidenced at low to medium nanoparticle loadings in composite membranes containing PVDF homopolymers (KYNAR PVDF 500 and 731). Conductivity data from composite membranes was subjected to statistical analysis using an unbalanced general linear model (GLM). The initial global analysis of conductivity (3-way GLM) revealed statistically significant effects of nanoparticle concentration ($F_{(2,1181)}=54.07$, $p<0.001$); nanoparticle type ($F_{(2,1181)}=20.64$, $p<0.001$), presumably related with dissimilar acidity among the different zirconium-based nanoparticles; and PVDF grade ($F_{(4,1181)}=172.58$, $p<0.001$). FIG. 5 shows plots of the unweighted means of proton conductivity (from the GLM analysis) for the composite membranes as function of nanoparticle type and nanoparticle mass fraction (both identified as significant factors). The effect of the latter is promptly seen as the lowest unweighted mean of conductivity corresponds to a nanoparticle loading of 5 wt %, supporting the above-mentioned reduction in conductivity ascribed to aggregation of the solid phase at high nanoparticle contents. In addition, a slight overall net gain in conductivity (2-3%) with respect to non-hybrid PVDF/PE references is noticed for composite membranes containing 0.5 wt % and 1 wt % zirconium-based additives (FIG. 5, right). A clear variation in mean conductivity according to nanoparticle type is evidenced as well (FIG. 5, left), with ZrS having a noticeable advantage over ZrO and ZrHP. This behavior is anticipated as the acidity of sulfated zirconia solids is among the strongest of all known solid superacids (Hammet acidity function $H_0 \leq -16.04$). Moreover, the small difference in conductivity noticed between ZrO- and ZrHP-based membranes is in agreement with a slightly improved conductivity observed in ZrO solid acid conductors compared to ZrHP[.

Figure 4A:
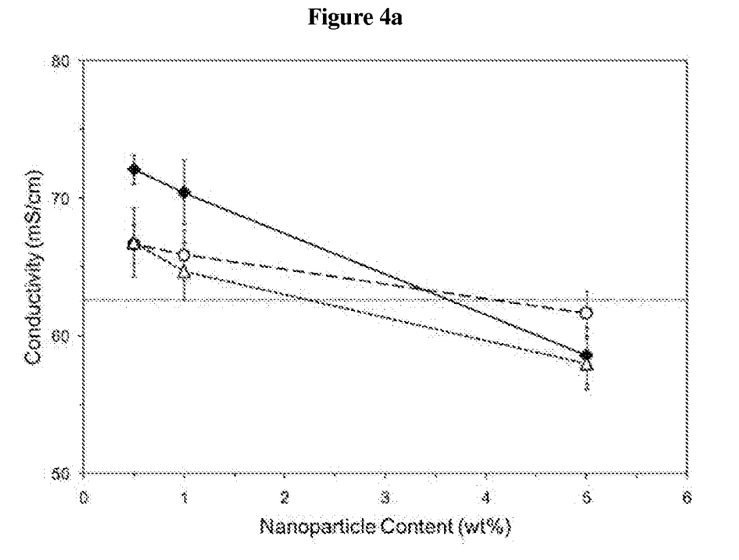
Figure 4B:
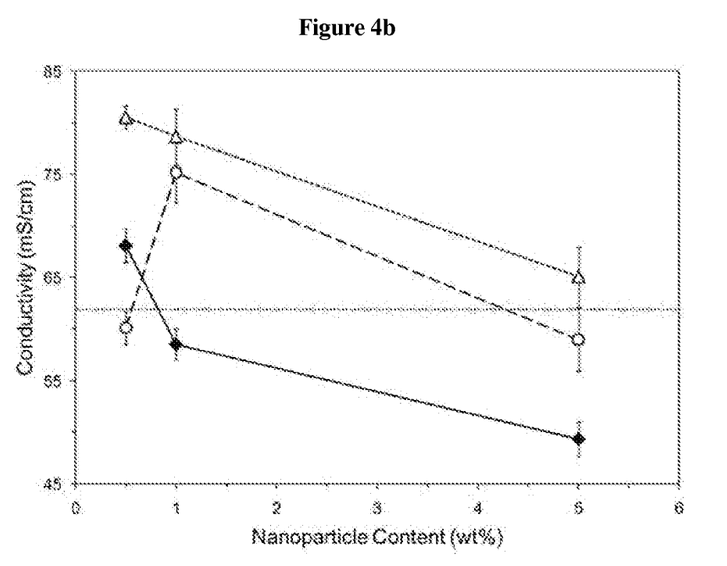
Figure 4C:
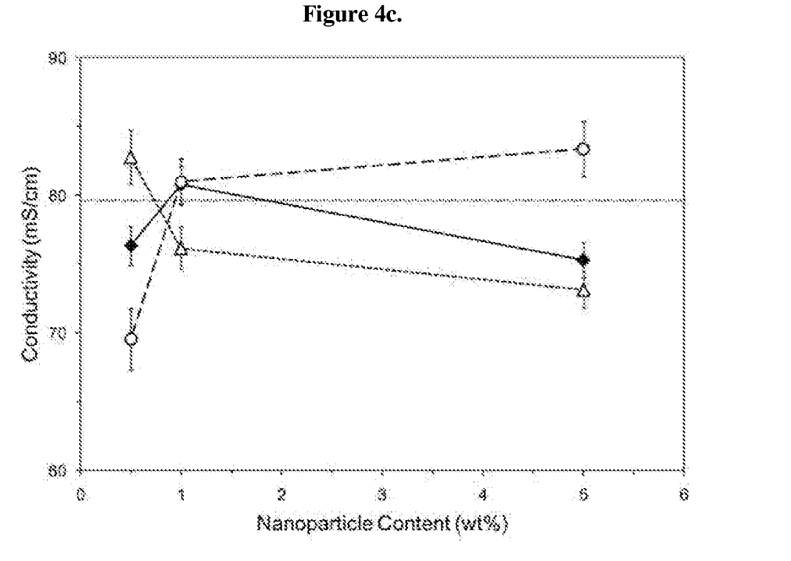
Figure 4D:
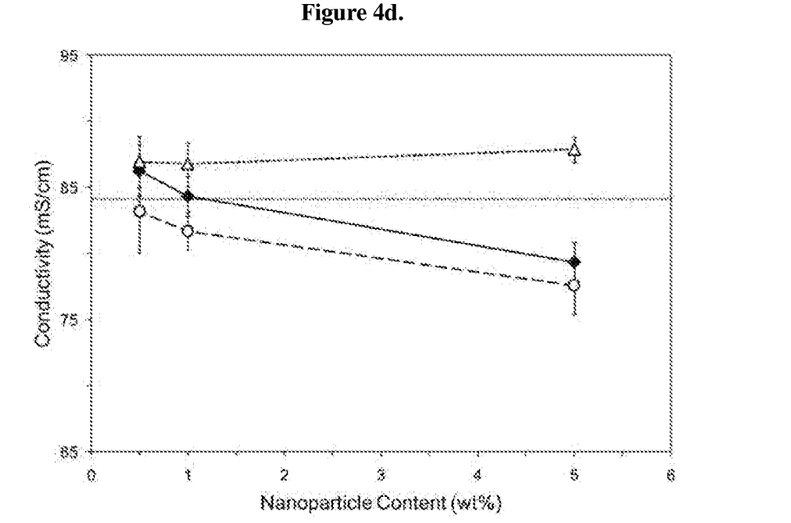
Figure 4E:
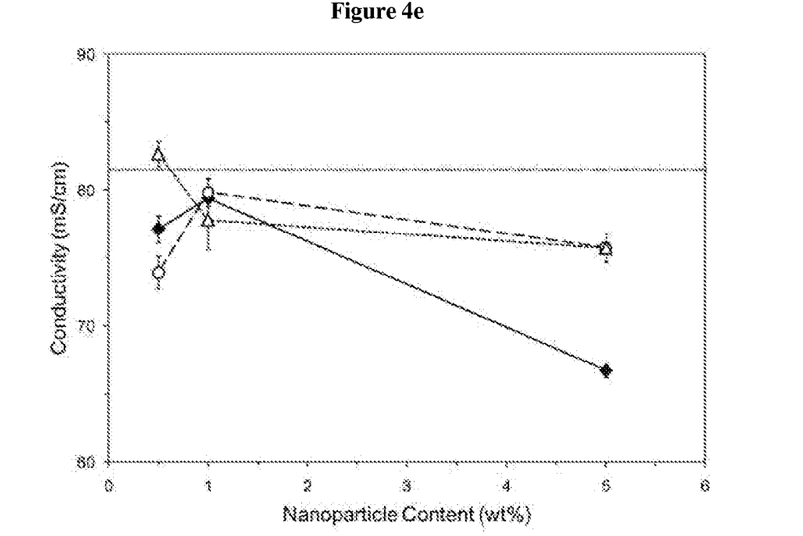
Figure 5:
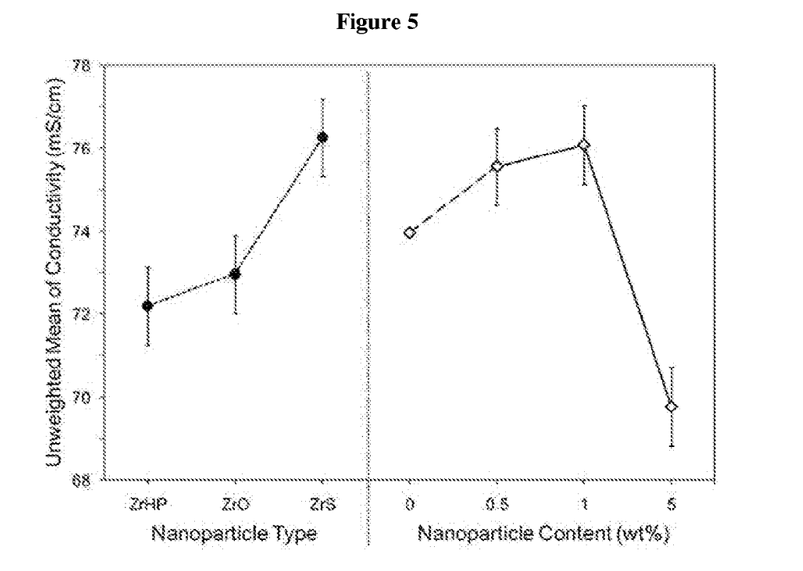

Interestingly, statistically significant (2-way GLM by PVDF type, $p<0.05$) conductivity increments resulting from the addition of zirconium-based acid inorganic fillers to PVDF/PE blends occurred only in membranes containing PVDF homopolymers (at low and medium nanoparticle loadings) (FIGS. 4a and 4b). Specifically, membranes based on KYNAR 500 exhibited overall conductivity increments of 9.5% and 7%, while those containing KYNAR 731 showed improvements of 12.4% and 14.3% at nanoparticle contents of 0.5 wt % and 1 wt %, respectively (comparison of unweighted means from independent 2-way GLM).

Besides the possibility of increasing mechanical strength and chemical stability, one of the main goals of incorporating solid acid particles in polymeric proton exchange membranes is to reduce the susceptibility of the membranes to changes in the degree of hydration, and improve their performance at intermediate operation temperatures (100-200° C.).

Mechanical Properties

Controlling the amount of inorganic additives and their degree of dispersion in a polymer matrix are fundamental factors leading to adequate mechanical properties of composite membranes in terms of flexibility and tear strength. Consequently, mechanical characterization of the composite membranes focused on two variables; namely, elastic modulus and toughness. It is important to underline that contrary to uniaxial deformation, typical of conventional mechanical characterization systems, membranes undergo axisymmetric biaxial deformation in HTMECH tests. Therefore care must be taken if the results presented herein are to be compared to uniaxial tensile tests, as differences in mechanical response should be expected between both deformation models.

Figure 6A:
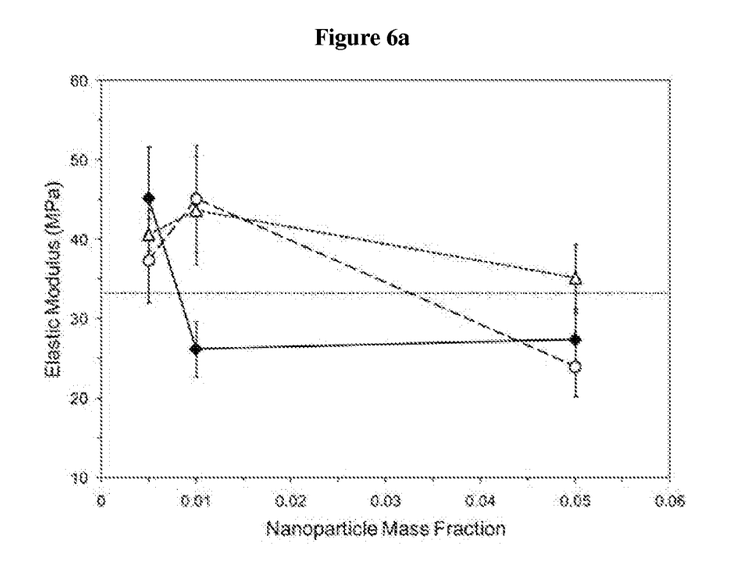
FIG. 6. Elastic modulus (biaxial) of PVDF/PE/ZrX composite membranes (ZrHP-♦-, ZrO -○-, ZrS -Δ-) by PVDF grade. (a) KYNAR® 500 and (b) KYNAR® 2851.
Figure 6B:
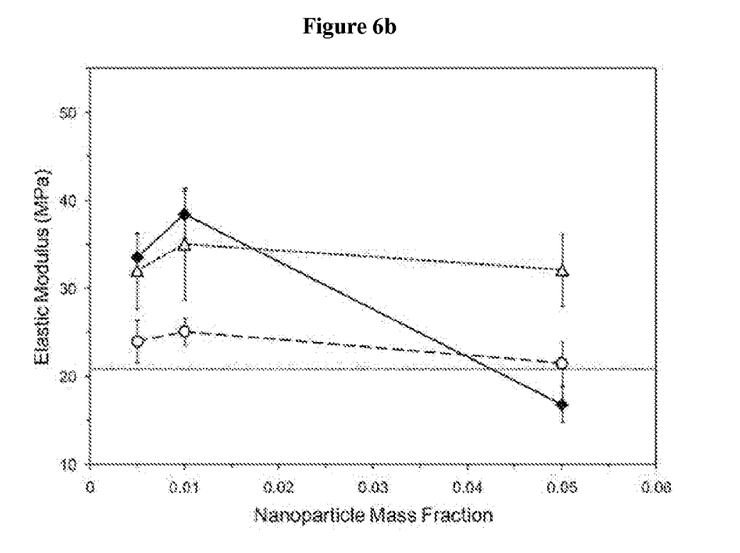
Figure 7A:
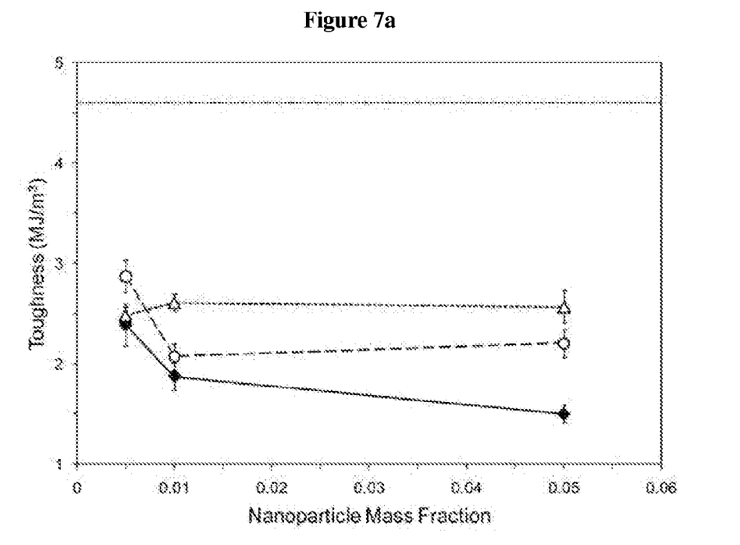
FIG. 7. Toughness (biaxial) of PVDF/PE/ZrX composite membranes (ZrHP -♦-, ZrO -○-, ZrS -Δ-) by PVDF grade. (a) KYNAR® 500 and (b) KYNAR® 2851.
Figure 7B:
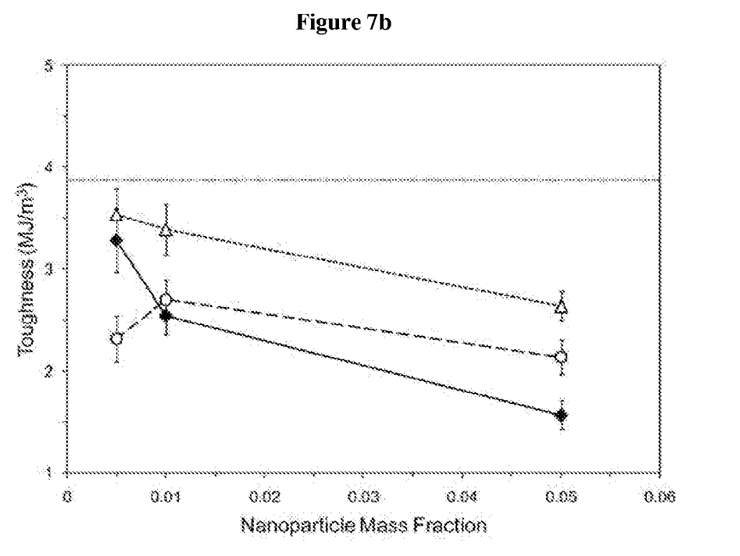

The corresponding profiles of elastic modulus and toughness of the composite membranes as a function of nanoparticle mass fraction are shown in FIGS. 6 and 7 respectively. A statistical analysis akin to that performed for proton conductivity revealed significant effects of nanoparticle content ($F_{(2,1105)}=37.19$, $p<0.001$), nanoparticle type ($F_{(2,1105)}=11.3$, $p<0.001$), and PVDF grade ($F_{(4,1105)}=249.52$, $p<0.001$) on membrane elastic modulus; however, the "practical" effect of nanoparticle content and type is weak in comparison to the effect of PVDF grade ($\eta_p^2 \leq 0.06$ vs. $\eta_p^2=0.48$, $\eta_p^2$: partial eta squared statistic). This is expected as the PVDF support matrix confers the tensile properties to the membranes. Likewise, significant effects of nanoparticle content ($F_{(2,1105)}=221.58$, $p<0.001$), nanoparticle type ($F_{(2,1105)}=129.94$, $p<0.001$), and PVDF grade ($F_{(2,1105)}=66.05$, $p<0.001$) on membrane toughness were identified; however, contrary to their effect on the membrane elastic modulus, the nanoparticle type and content have an important effect on toughness. Generally the size of nanoparticles is too small to provide toughening through a crack-bridging mechanism, and they cannot effectively enhance crack trajectory tortuosity; therefore, the strong effect of nanoparticle type and content on toughness may be directly related with factors such as membrane stiffening and/or defect sites arising from the insertion of nanoparticles.

Figure 8:
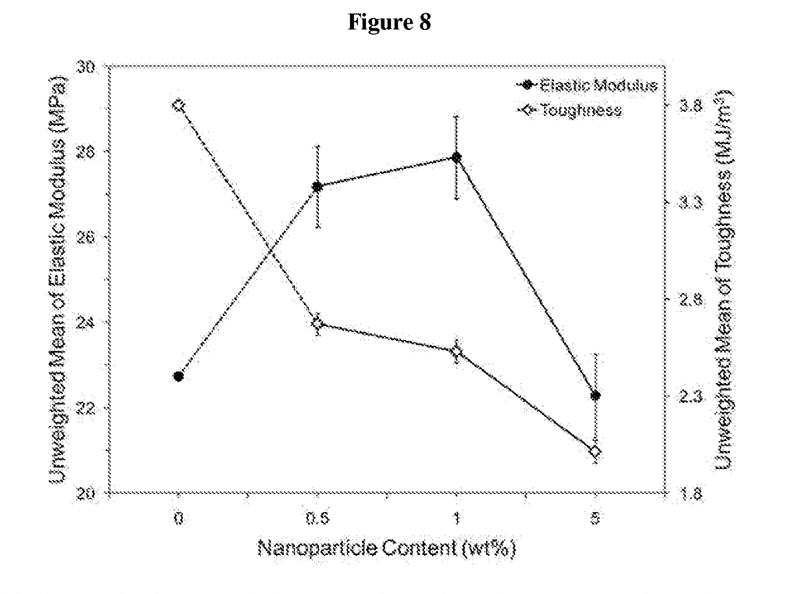
FIG. 8. Global unweighted means of elastic modulus and toughness, estimated from 3-way univariate unbalanced GLM analysis (full factorial model), as a function of nanoparticle content. Error bars represent the upper and lower bounds of 95% confidence intervals.

Despite the reduced effect of nanoparticle content on the membrane elastic modulus, an apparently reinforcing effect in comparison to non-hybrid membranes is evidenced at low to medium particle loadings. The effect is especially manifest in composite membranes containing flexible PVDF:HFP copolymers (statistically significant, 2-way GLM by PVDF type, $p<0.05$), thus suggesting an increment in membrane stiffness. On the contrary, toughness diminished for all composite membranes at all nanoparticle contents (statistically significant, 2-way GLM by PVDF type, $p<0.001$), presumably due to the abovementioned membrane stiffening and high density of membrane defects at high particle loadings due to solid-phase aggregation (FIGS. 3d and 3e). To further visualize the effect of inorganic zirconium-based nanofillers on the mechanical properties of composite membranes, the global unweighted means of elastic modulus and toughness are presented in FIG. 8. A clear reinforcing stiffening effect with respect to reference PVDF/PE membranes, characterized by an overall elastic modulus increase of 19.5% and 22.5%, is evidenced at nanoparticle loadings of 0.5 wt % and 1 wt %, respectively. This stiffening correlates perfectly with an overall reduction in membrane toughness (29.7% and 33.4% decline) at identical nanoparticle contents. These results are in accordance with the mechanical behavior observed in other organic/inorganic systems where nanocomposites stiffen efficiently but tend to fail prematurely as a result of toughness reduction. The abrupt reduction in the overall elastic modulus (22.5% increase to 2% decrease) and further toughness decline (33.4% to 46.9% reduction) at the transition from medium to high nanoparticle loadings, confirms the formation of membrane defects derived from particle agglomerates that adversely affect the energy absorption capability of the membrane during mechanical deformation.

What is claimed is:

1. A composite blend membrane comprising a blend of:
    a) fluoropolymer, wherein said fluoropolymer is a polyvinylidene fluoride homopolymer or copolymer containing at least 70 weight % of vinylidene fluoride monomer units;
    b) one or more polyelectrolytes; and
    c) one or more types of nanoparticles, wherein said nanoparticles are selected from the groups consisting of metal sulfates, metal phosphates, nanoclays, zirconium hydrogen phosphate, zirconium hydroxide sulfated, zirconium phosphate, zeolites, silica, sulfonated silica, carbon nanotubes, graphenes, fullerenes, nanodiamonds, sulfonated nanotubes, silsesquioxanes, silsesquioxanes functionalized with groups containing sulfonic acid, metal-organic framework (MOF) materials, transition metal sulfides, transition metal selenides, transition metal tellurides, cadmium selenide (CdSe), cadmium telluride (CdTe), lead sulfide (PdS), palladium, gold and platinum, graphene, graphite, and montmorillonite, and wherein said nanoparticles have a diameter of from 0.5 nm to 1000 nm.

2. The composite blend membrane of claim 1 comprising a blend of:
    a) from 5 to 95 percent by weight of fluoropolymer;
    b) from 5 to 95 percent by weight of one or more polyelectrolytes; and
    c) from 0.1 to 20 percent by weight of one or more types of nanoparticles.

3. The composite blend membrane of claim 1 comprising a blend of:
    a) from 80 to 99.9 percent by weight of one or more polyelectrolyte; and
    b) from 0.1 to 20 percent by weight of one or more types of nanoparticles.

4. The composite blend membrane of claim 1 comprising a blend of:
    a) from 20 to 70 percent by weight of fluoropolymer;
    b) from 30 to 80 percent by weight of one or more polyelectrolytes; and
    c) from 0.1 to 10 percent by weight of one or more types of nanoparticles.

5. The composite blend membrane of claim 1, wherein said nanoparticles are selected from the group consisting of zirconium hydrogon phosphate, zirconium hydroxide sulfated, sulfated zirconia, and zirconium phosphate.

6. The composite blend membrane of claim 1, wherein said polyelectrolyte contains sulfonated groups, phosphonated groups, or a mixture thereof.

7. The composite blend membrane of claim 1, wherein said polyelectrolyte is a copolymer of one or more ioinic and/or ionizable monomer(s) and one or more monomers (co)polymerizable with said ionic and/or ionizable monomer(s).

8. The composite blend membrane of claim 1, wherein said polyelectrolyte contains protogenic/acidic groups that are in the neutralized form.

9. The composite blend membrane of claim 1, wherein said dry membrane has a thickness of from 1 nm to 2 mm.

10. The composite blend membrane of claim 1, wherein said nanoparticles are single or multi-walled carbon nanotubes.

11. A composite blend film, membrane of coating comprising a blend of a polyvinylidene fluoride polymer and nanodiamonds, wherein said polyvinylidene fluoride polymer is a polyvinylidene fluoride homopolymer or copolymer containing at least 70, weight % of vinylidene fluoride monomer units.

* * * * *